Feb. 17, 1931. F. E. STOCKELBACH 1,792,717
PROCESS OF MAKING SAFROL DERIVATIVES SUCH AS VANILLIN AND ISOCHAVIBETOL
Filed May 17, 1927
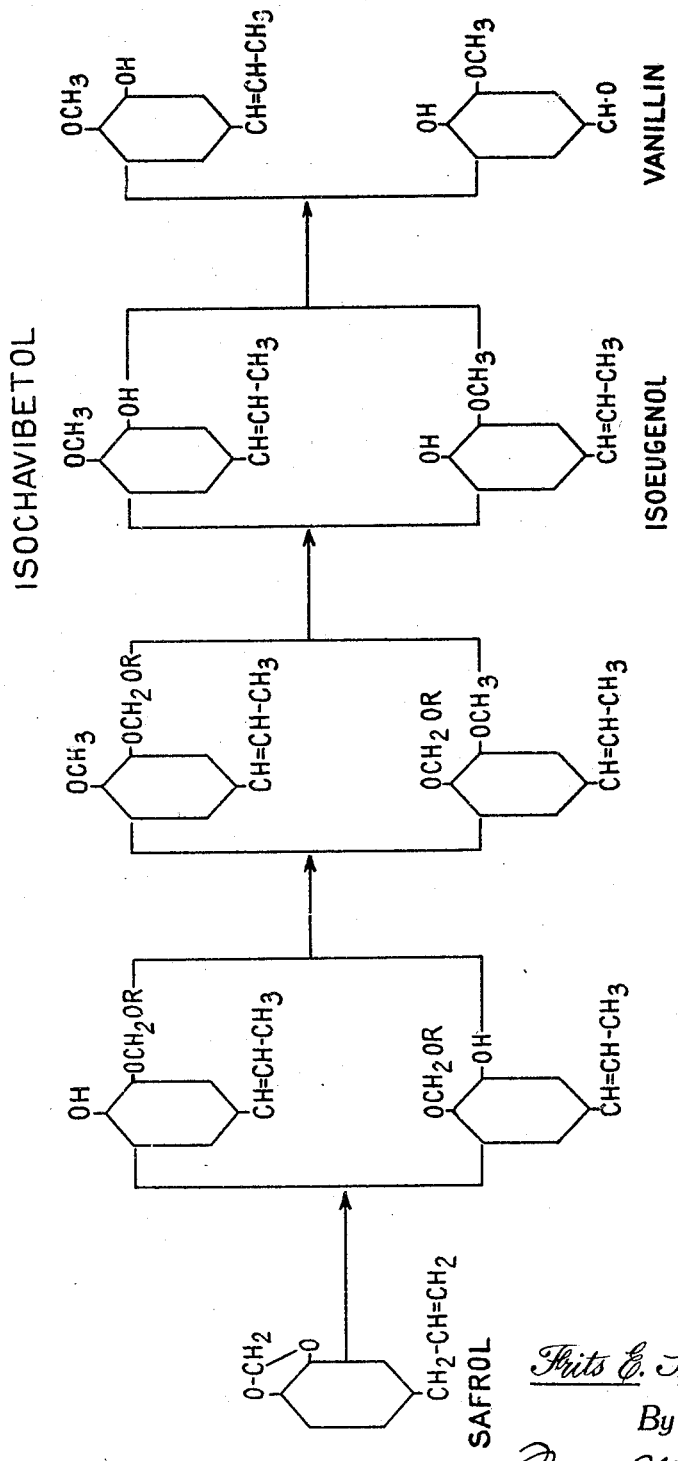
INVENTOR:
Frits E. Stockelbach,
By Attorneys,
Fraser, Myers & Manley.

Patented Feb. 17, 1931

1,792,717

UNITED STATES PATENT OFFICE

FRITS E. STOCKELBACH, OF MONTCLAIR, NEW JERSEY

PROCESS OF MAKING SAFROL DERIVATIVES SUCH AS VANILLIN AND ISOCHAVIBETOL

Application filed May 17, 1927. Serial No. 191,973.

The present invention relates to the process of making safrol derivatives, and more particularly to the process of making vanillin and isochavibetol from safrol.

The invention as herein described provides a simple, direct and cheap process of obtaining vanillin from the relatively cheap and abundant raw material safrol and of obtaining isochavibetol as a by-product of said process.

The steps in the formation of vanillin and isochavibetol from safrol are schematically represented in the accompanying drawing.

A particular description of the process follows.

When safrol is heated with alcoholic potash to a temperature of 100°–120° C., an intramolecular re-arrangement in the safrol molecule takes place resulting in the allyl group being transformed into a propenyl group, and isosafrol is the final product; but if the mixture is heated to 140°–170° C., a secondary reaction takes place resulting in the linkage between the methylene group and either one of the oxy groups being broken, while simultaneously therewith the alcohol radical attaches itself to the methylene group with the formation of phenol ethers of acetal-like character.

I have found, however, that contrary to previous investigations, safrol yields, when heated with alcoholic potash to a temperature of 140°–170° C., a mixture of two possible isomers, namely, 4 - alkoxymethoxy - 3 - hydroxy-1-propenylbenzol, and 4-hydroxy-3-alkoxymethoxy-1-propenylbenzol. This discovery on my part makes possible the commercial production of vanillin from safrol by the further treatment of the 4-alkoxymethoxy-3-hydroxy-1-propenylbenzol of said reaction.

When the isomeric reaction product obtained according to the above reaction is methylated, a product containing a mixture of methyl ethers of the two isomers is obtained, and upon heating this resulting product in a weak acid solution, the mixed ether group is split off with the evolution of formaldehyde and an alcohol and the formation of isoeugenol and its isomer isochavibetol.

I have now found that, when this mixture of isoeugenol and isochavibetol is subjected to the action of certain oxidizing agents, that only the 4-hydroxy isomer, that is, isoeugenol, is oxidized, while the 3-hydroxy isomer, that is, isochavibetol, remains unoxidized and is readily recoverable. This discovery on my part makes possible the commercial production of vanillin from the cheap raw material safrol, and of obtaining as a by-product the valuable phenol, isochavibetol.

In order to enable those skilled in the art to practice the present invention, detailed descriptions of the procedure and of the quantities of the materials employed are here given.

The mixture of 1000 pounds safrol, 1000 pounds caustic potash and 1000 pounds of an alcohol having the generic formula ROH, preferably ethyl alcohol, is heated in an autoclave to 140°–170° C. for about an hour. After cooling, the contents of the autoclave are dissolved in water and any unconverted oil steamed off, while the reaction product containing the two isomeric phenol ethers as salts remains in solution. The solution is then acidified with a dilute acid and the mixture of the two free isomeric phenol ethers separated from the aqueous solution. 1000 pounds of the reaction product is then methylated by dissolving it in a solution containing 2357 pounds of water, 236 pounds of caustic soda, and allowing 608 pounds of dimethyl sulphate to run into said solution under constant stirring. When the methylation is completed, the methylated oil comes to the top of the solution and is separated therefrom and washed until neutral. 1000 pounds of the methylated oil is then boiled with a weak acid, preferably in the presence of ethyl alcohol, until the reaction is complete, which usually requires several hours. The alcohol used is recovered by distillation and the reaction product, consisting of a mixture of isoeugenol and isochavibetol, separates out as a heavy oil which solidifies upon cooling. This reaction product may be washed before cooling and distilled in vacuum, its boiling point being about 125° C. at a pressure of 3 mm. The distilled product is so pure that it crystallizes in the distillate receiver, said crystalline mass liquifying at 40°–45° C.

965 pounds of the mixture of the last mentioned isomeric phenols obtained according to the preceding paragraph are dissolved in 1000 pounds of caustic potash solution of about 51° Baumé, and to this solution is added 1000 pounds of aniline oil. After thorough mixing, the solution is allowed to settle, and the excess of caustic potash solution which separates out is drawn off from the bottom.

The clear solution of the phenol salts in aniline oil is then transferred to a still provided with an agitator, a jacket for heating and cooling, and a condenser, and to the solution is added 550 pounds of caustic soda solution of about 52° Baumé. The agitator is set in motion and the temperature brought up to about 110° C. To this alkaline mixture is then added 750 pounds of nitrobenzol, three to four hours being taken to add said nitrobenzol, care being exercised that the temperature shall remain between 120°–130° C. during the procedure. When all the nitrobenzol has been added, the mixture is allowed to digest for another hour or so, and the temperature allowed to reach 140° C. During this last hour some water and aniline oil distils over and is recovered.

When the oxidizing action of the nitrobenzol upon the phenol salts is completed, steam is admitted into the jacket of the still and the contents of the still subjected to steam distillation, whereupon the free aniline oil with water vapor, together with the excess of nitrobenzol, distils over. When the distillate shows that nearly all the aniline oil has been distilled over, the steam distillation is discontinued and the contents of the still emptied into a tank having about three times the volume of the contents of the still, and enough hot water is added to fill the tank. The azobenzol formed by the reduction of the nitrobenzol separates as a heavy oil, which sinks to the bottom of the tank. The liquid in the tank is allowed to cool, at which time the azobenzol at the bottom of the tank will have solidified. The supernatant alkaline liquid is thereupon separated from the azobenzol in any desired manner.

This alkaline liquid contains at this stage of the process the sodium salts of the unoxidized isochavibetol and of vanillin. The alkaline liquid is filtered through a filter press and transferred to a suitable tank provided with an agitator. 100 gallons of a suitable solvent, such as toluol, is added to the tank, the agitator set in motion, and sufficient sulphuric acid of about 29° Baumé slowly added so as to leave the solution slightly acid. When this point has been reached, the agitator is stopped, and the toluol solution, which now contains the free vanillin and the free unoxidized phenol hereinbefore specified, is allowed to separate from the aqueous solution.

The toluol solution is separated from the aqueous solution and transferred to a lead lined tank provided with an agitator, and the aqueous solution left in the first tank is extracted once more with toluol, this time with 50 gallons, allowed to separate as before, and the toluol solution separated from the aqueous solution and transferred to the toluol solution already in the lead lined tank.

In order to separate the vanillin from the unoxidized phenol, both of which are contained in the toluol solution, the toluol solution is extracted three times with an aqueous solution of sodium bisulphite with which the aldehyde combines, forming a soluble double salt of the usual type. When this extraction is completed there remains in the toluol solution only the unoxidized phenol, together with such impurities as are formed during the process, while the aqueous sodium bisulphite solution contains practically all the vanillin in the form of a soluble double salt.

The aqueous solution containing the vanillin double salt is then heated in a lead lined tank with sufficient dilute sulphuric acid to liberate the sulphurous acid from both the excess sodium bisulphite, as well as from the sodium bisulphite in combination with the vanillin. The solution is boiled gently until all the gaseous sulphurous acid has been eliminated. This treatment liberates the vanillin combined with the sodium bisulphite and the vanillin crystallizes upon cooling from the solution in a high state of purity and in good yield.

The toluol solution which contains the unoxidized phenol is now extracted with a ten per cent. caustic soda solution which dissolves the phenol, leaving back in the toluol impurities not soluble in alkali. From the alkaline solution the free phenol ether is obtained by adding sufficient sulphuric acid to render the solution acid, and the phenol ether separated out from the aqueous solution. This phenol ether, isochavibetol, is washed until neutral and is then vacuum distilled and crystallized from alcohol. Said isochavibetol is a white crystalline substance having a melting point of 93°–94° C.

From the foregoing detailed descriptions it will be seen that I have devised a novel and simple process of cheaply obtaining vanillin from safrol and of also obtaining as a by-product of said process, isochavibetol.

While I have hereinbefore described certain preferred steps in the processes of obtaining the safrol derivatives specified, I do not wish to be limited to the specific reactions, substances employed, or conditions of separating said substances, but deem it within the scope and spirit of my invention to deviate

What I claim is:

1. The process of obtaining safrol derivatives which consists in converting safrol into a mixture of the isomeric phenol ethers 4-methoxy-3-hydroxy-1-propenylbenzol (isochavibetol) and 4-hydroxy-3-methoxy-1-propenylbenzol (isoeugenol) and oxidizing one of said phenol ethers to an aldehyde.

2. The process of obtaining safrol derivatives which consists in converting safrol into a mixture of the isomeric phenol ethers 4-methoxy-3-hydroxy-1-propenylbenzol (isochavibetol) and 4-hydroxy-3-methoxy-1-propenylbenzol (isoeugenol) and treating the mixture of said isomeric phenol ethers with an oxidizing agent which will oxidize one of said phenol ethers and not the other.

3. The process of obtaining safrol derivatives which consists in converting safrol into a mixture of the isomeric phenol ethers 4-methoxy-3-hydroxy-1-propenylbenzol (isochavibetol) and 4-hydroxy-3-methoxy-1-propenylbenzol (isoeugenol) and treating the mixture of said isomeric phenol ethers with an oxidizing agent which will oxidize one of said phenol ethers to an aldehyde and not the other.

4. The process of obtaining safrol derivatives which consists in converting safrol into a mixture of the isomeric phenol ethers 4-methoxy-3-hydroxy-1-propenylbenzol (isochavibetol) and 4-hydroxy-3-methoxy-1-propenylbenzol (isoeugenol) and treating the mixture of said isomeric phenol ethers in alkaline solution with nitrobenzol.

5. The step in the process of obtaining vanillin from safrol which consists in converting the safrol into a mixture of the isomeric phenols, isochavibetol and isoeugenol, and treating the mixture of said isomeric phenols with an oxidizing agent which will oxidize the isoeugenol and not the isochavibetol.

6. The step in the process of obtaining vanillin from safrol which consists in converting the safrol into a mixture of the isomeric phenols, isochavibetol and isoeugenol, and treating the mixture of said isomeric phenols in alkaline solution with nitrobenzol.

7. The process of obtaining vanillin from a mixture of the isomeric phenols, isochavibetol and isoeugenol, which consists in dissolving said mixture with caustic alkali in a suitable solvent, heating with an oxidizing agent which will oxidize the isoeugenol to vanillin and not oxidize the isochavibetol, and treating the resulting product to obtain the vanillin therefrom.

8. The process of obtaining vanillin from a mixture of the isomeric phenols, isochavibetol and isoeugenol, which consists in dissolving said mixture with caustic alkali in aniline oil, heating with nitrobenzol and treating the resulting product to obtain the vanillin therefrom.

9. The process of obtaining vanillin from a mixture of the isomeric phenols, isochavibetol and isoeugenol, which consists in dissolving said mixture with caustic alkali in aniline oil, heating said solution with nitrobenzol, distilling the resulting product with steam until nearly all the aniline oil and excess nitrobenzol have been distilled over, removing from the residue the azobenzol formed and other undesirable reaction products, rendering the residue slightly acid, extracting therefrom with a suitable solvent the contained soluble products, and further treating said solution to separate the vanillin therefrom.

10. The process of obtaining vanillin from a mixture of the isomeric phenols, isochavibetol and isoeugenol, which consists in dissolving said mixture with caustic alkali in aniline oil, heating said solution with nitrobenzol, distilling the resulting product with steam until nearly all the aniline oil and excess nitrobenzol have been distilled over, removing from the residue the azobenzol formed and other undesirable reaction products, rendering the residue slightly acid, extracting therefrom with a suitable solvent, such as toluol, the contained soluble products, extracting the vanillin from said solution with an aqeous solution of sodium bisulphite and heating said solution with dilute sulphuric acid to recover the vanillin.

11. The process of obtaining safrol derivatives which consists in converting safrol into a mixture of two isomeric phenols having a lateral chain —CH=CH—CH$_3$ and treating the mixture of said isomeric phenols with an oxidizing agent which will oxidize the lateral chain of one of said phenols to produce the corresponding aldehyde and leave the other phenol unoxidized.

12. The process of obtaining safrol derivatives which consists in converting safrol into a mixture of two isomeric phenols having a lateral chain —CH=CH—CH$_3$ and treating the mixture of said isomeric phenols with nitrobenzol in the presence of an excess of free alkali which will oxidize the lateral chain of one of said phenols to produce the corresponding aldehyde and leave the other phenol unoxidized.

In witness whereof, I have hereunto signed my name.

FRITS E. STOCKELBACH.